(12) United States Patent
Lopes et al.

(10) Patent No.: US 8,290,935 B1
(45) Date of Patent: Oct. 16, 2012

(54) METHOD AND SYSTEM FOR OPTIMIZING DATABASE SYSTEM QUERIES

(75) Inventors: Arthur Vargas Lopes, San Diego, CA (US); Pradeep Sathyanarayan, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1573 days.

(21) Appl. No.: 10/855,476

(22) Filed: May 27, 2004

(51) Int. Cl.
*G06F 7/00* (2006.01)

(52) U.S. Cl. ........................................................ 707/718

(58) Field of Classification Search ........... 707/2, 104.1, 707/100, 10, 5, 713, 718, 999.102
See application file for complete search history.

(56) References Cited

U.S. PATENT DOCUMENTS

| | | | | |
|---|---|---|---|---|
| 5,546,576 A * | 8/1996 | Cochrane et al. | ..................... | 1/1 |
| 5,802,521 A * | 9/1998 | Ziauddin et al. | ..................... | 1/1 |
| 5,857,180 A * | 1/1999 | Hallmark et al. | ..................... | 1/1 |
| 5,873,075 A * | 2/1999 | Cochrane et al. | ..................... | 1/1 |
| 6,356,887 B1 * | 3/2002 | Berenson et al. | ..................... | 1/1 |
| 6,618,729 B1 * | 9/2003 | Bhashyam et al. | ..................... | 1/1 |
| 6,622,138 B1 * | 9/2003 | Bellamkonda et al. | ................ | 1/1 |
| 7,272,591 B1 * | 9/2007 | Ghazal et al. | ......................... | 1/1 |
| 2004/0220904 A1 * | 11/2004 | Finlay et al. | ...................... | 707/3 |
| 2004/0225639 A1 * | 11/2004 | Jakobsson et al. | ................ | 707/2 |

* cited by examiner

*Primary Examiner* — Hosain Alam
*Assistant Examiner* — Eliyah S Harper
(74) *Attorney, Agent, or Firm* — Howard Speight (57) ABSTRACT

A method, computer program, and database system are disclosed for optimizing a query of a table based on one or more values in one or more columns of the table. The method includes repeating the following steps for a series of rows in the table and optimizing an execution plan for the query based at least in part on a calculated number of rows per unique value. One or more values for the one or more columns are read. The read values are determined to be different from all previously read values in some cases. When the read values are different, the one or more values are recorded in a data structure corresponding to the result of applying a hash function to the one or more values.

21 Claims, 6 Drawing Sheets

METHOD AND SYSTEM FOR OPTIMIZING DATABASE SYSTEM QUERIES

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

When a relational database system receives a query from a user, an execution plan for the query is generated. An optimizer programmed to determine the most efficient execution plan can use known statistics regarding the data stored in the database, e.g. metadata, to compare different plans. Resource conserving plans can be identified with greater statistical confidence if the distribution of unique values among a large number of records can be determined.

SUMMARY

In general, in one aspect, the invention features a method for executing database queries. The method includes repeating the following steps for a series of rows in the table and optimizing an execution plan for the query based at least in part on a calculated number of rows per unique value. One or more values for the one or more columns are read. The read values are determined to be different from all previously read values in some cases. When the read values are different, the one or more values are recorded in a data structure corresponding to the result of applying a hash function to the one or more values.

Implementations of the invention may include one or more of the following: implementing each data structure as a linked list, identifying the data structure by an array of hash function results, incrementing a unique values counter when the one or more values are recorded in a data structure.

In general, in another aspect, the invention features a computer program for executing database queries. The program includes executable instructions that cause a computer to repeat the following steps for a series of rows in the table and optimize an execution plan for the query based at least in part on a calculated number of rows per unique value. One or more values for the one or more columns are read. The read values are determined to be different from all previously read values in some cases. When the read values are different, the one or more values are recorded in a data structure corresponding to the result of applying a hash function to the one or more values.

In general, in another aspect, the invention features a database system for executing database queries. The database system includes one or more nodes; a plurality of CPUs, each of the one or more nodes providing access to one or more CPUs; and a plurality of virtual processors, each of the one or more CPUs providing access to one or more virtual processors, each virtual processor configured to manage data, including rows organized in tables, stored in one of a plurality of data-storage facilities. The database system also includes an optimizer that is configured to repeat the following steps for a series of rows in the table and optimize an execution plan for the query based at least in part on a calculated number of rows per unique value. One or more values for the one or more columns are read. The read values are determined to be different from all previously read values in some cases. When the read values are different, the one or more values are recorded in a data structure corresponding to the result of applying a hash function to the one or more values.

DETAILED DESCRIPTION

Figure 1:
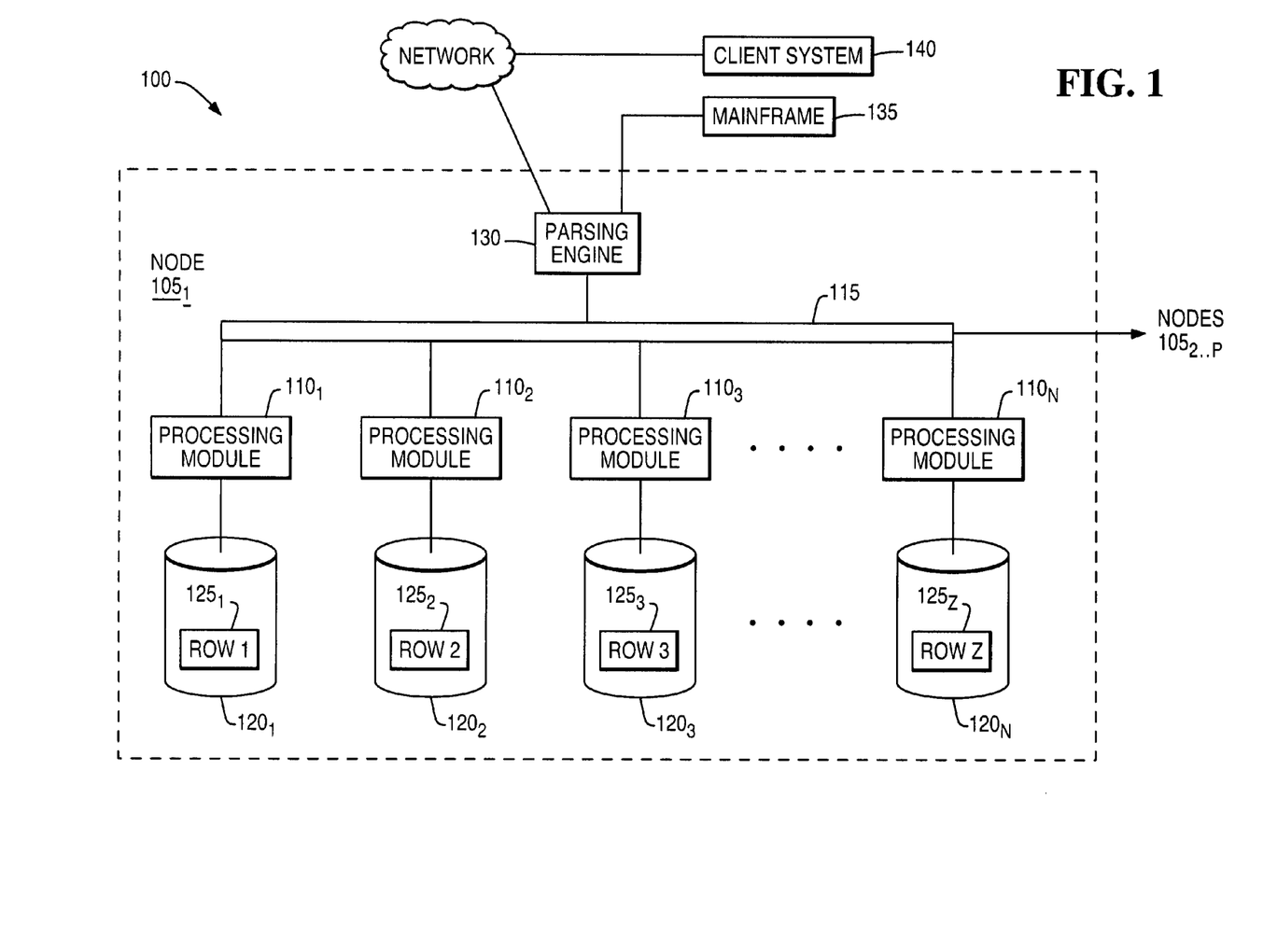
FIG. 1 is a block diagram of a node of a parallel processing database system.

The query optimization technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors. The virtual processors can support virtual processes.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
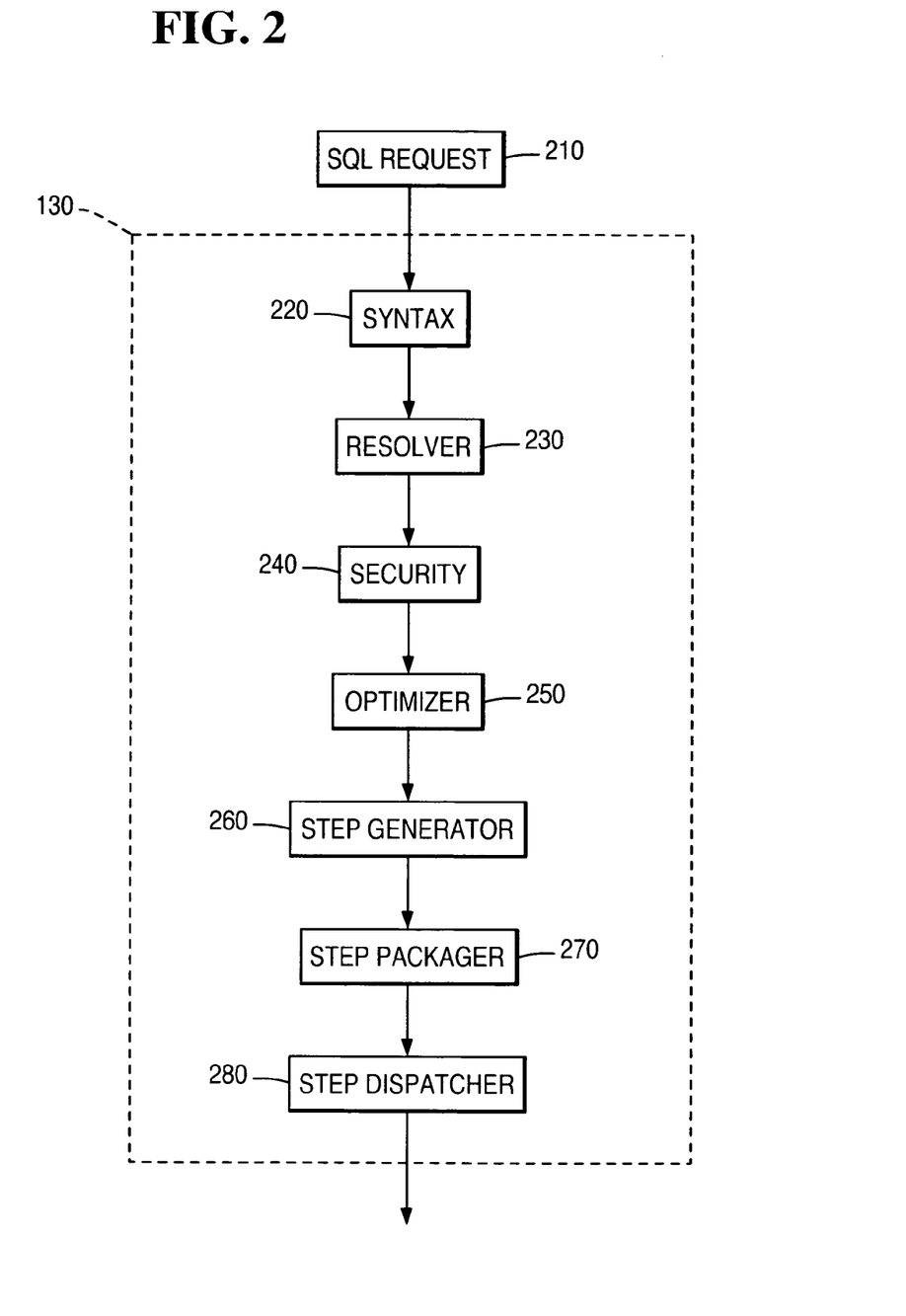
FIG. 2 is a block diagram of a parsing engine.

FIG. 2 is a block diagram of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. A high cost is associated when a large amount of system resources is required to generate a temporary result.

After estimating the costs associated with potential query execution plans, the optimizer 250 chooses the plan that has the lowest estimated cost. The more accurate the estimates of cost for particular execution plans, the more likely the optimizer 250 is to choose the correct plan. The optimizer 250 can access statistics describing the information stored in the database to help estimate the cost of conditions and temporary results corresponding to steps in query execution plans. In some situations, however, there may be no stored statistics.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for reach query can result in longer wait times for every user.

Figure 3:
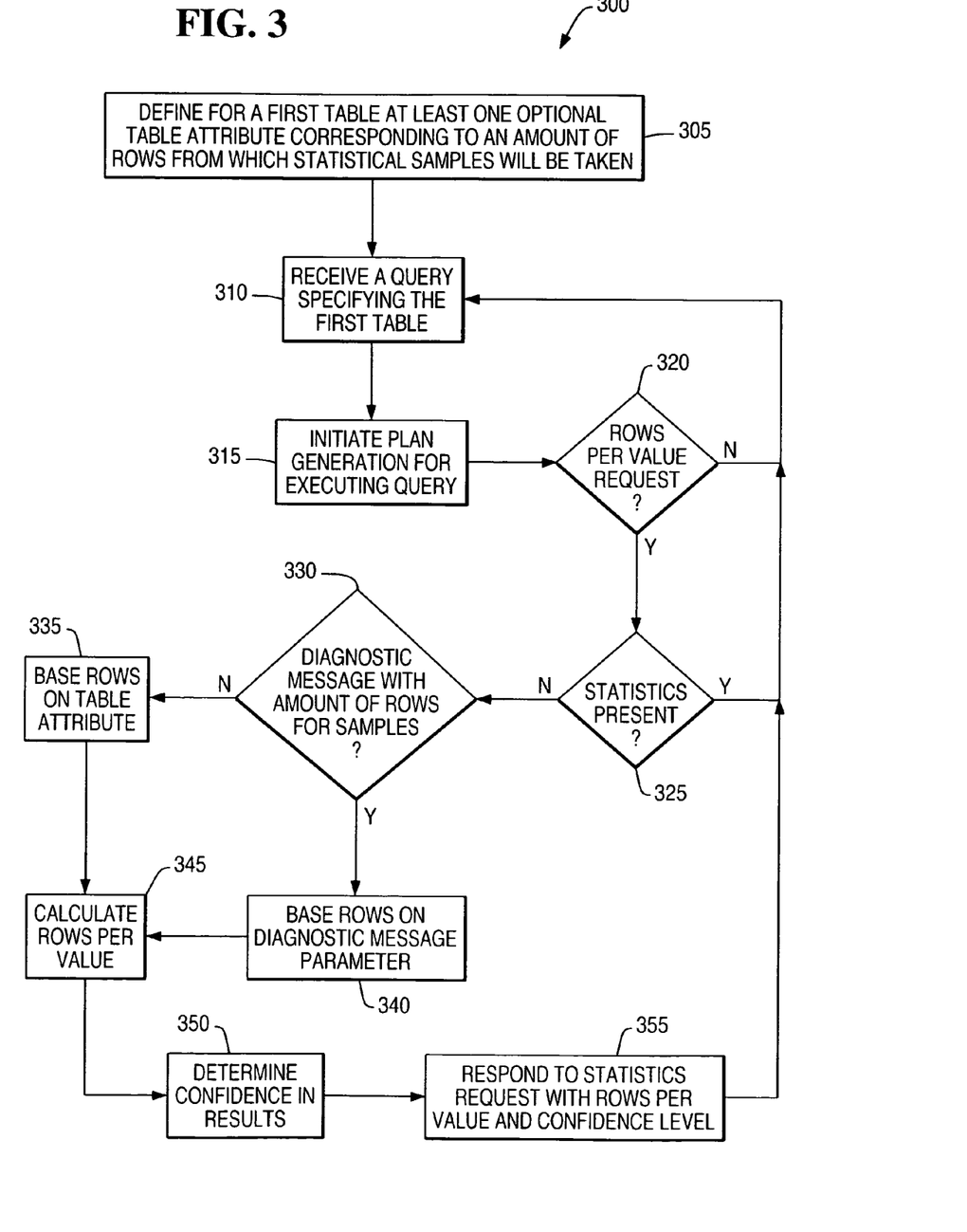
FIG. 3 is a flow chart of one method for optimizing a query of a table based on one or more values in one or more columns of the table.

FIG. 3 is a flow chart of one method 300 for optimizing a query of a table based on one or more values in one or more columns of the table. Initially, a first table is defined with at least one optional table attribute corresponding to an amount of rows from which statistical samples will be taken 305. In one implementation, the attribute is a percentage of the rows. An example of a table definition specifying a percentage of rows for statistical sampling is shown below.

CREATE TABLE T1(Column1 Integer PRIMARY INDEX, Column2 Char(20))
,SAMPLERPV=(8.5, Column2);

The preceding implementation creates a two column table with identifier T1. The attribute that specifies the amount of rows is SAMPLERPV and it is set to 8.5% for the second column, i.e., Column2. If a subsequent query requires statistics concerning rows per unique value (RPV) of the second column, those statistics would be estimated based on 8.5% of the rows, unless a session specific or query specific parameter overrode the table attribute. RPV can also be determined based on more than one column. For example, a table might include a first column containing values corresponding to the day on which a sale occurred and a second column containing values corresponding to the product number sold. The optimizer 250 could receive a query for which the number of rows corresponding to each unique day-product pair is relevant to determining the best execution plan. In that case, statistics would needed for rows per unique value of the first and second columns.

Once the table is created, whether or not the optional attribute is set, a query can be received that specifies that table 310. One example query specifying the above-defined table, as well as a second table T2, is shown below.

SELECT * FROM T1 WHERE
T1.Column2 IN (SELECT T2.Column2 FROM T2);

As discussed with reference to FIG. 2, the query is processed by the various components of the parsing engine 130. When the query reaches the optimizer 250, various plans for executing the query are generated 315. The efficiency of one plan in contrast to another can depend upon the data structure of the tables addressed in the query. As just one example, first and second potential execution plans could be generated for query where the first execution plan will require fewer resources than the second execution plan if there are fewer than 10 rows of T1 per unique value of the second column of T1. When the efficiency choice between plans depends upon the rows per unique value in a column of a table, a request can be made for rows per value that indicate that characteristic 320. If no requests for rows per value are made, then the query is executed according to the chosen plan, which did not require rows per value to choose, and the system waits for the next query to be received 310. If a request for rows per value is received, then the database system determines if the required statistics are already available 325. For example, in some database systems there are time during the day or week when usage is low and the system can collect statistics regarding the data. Those statistics are stored and can be accessed by the optimizer 250 in choosing plans. In that case, the plan chosen based on the stored statistics is executed and the system waits for the next query to be received 310. Such statistics are not always present, however, and, if necessary, the optimizer can then sample the data to choose between the execution plans.

In one implementation of sampling the data, the optimizer 250 can determine whether a diagnostic message specified the amount of rows that can be used to determine the RPV 330. One example of such a diagnostic message is DIAGNOSTIC SAMPLERPV=8.5 FOR SESSION. Queries received in the session after that diagnostic message would use 8.5% of the available rows to generate RPV statistics. If there is no diagnostic message, the percentage specified by the table attribute is used 335. If there is a diagnostic message, the percentage it specified is used 340. In another implementation, the table attribute takes higher precedence when the table attribute and the diagnostic message are both present. When there is neither a table attribute nor a diagnostic message, a default can be used. In one implementation, the default could be 10 rows. In a conventional system, sampling always is done with 10 rows, making that the required setting rather than a default.

Once the applicable number of rows is specified, the RPV is calculated 345 based at least in part on the number of rows specified. One implementation of calculating RPV is discussed in more detail with regard to FIG. 4. One implementation of adjusting the number of rows used is discussed in more detail with regard to FIG. 5. One implementation of a data structure used while calculating RPV is illustrated in FIG. 6.

In one implementation, a confidence level is then determined 350 for the results based at least in part on the identified processing modules. For example, the number of identified processing modules can be compared to the total number of processing modules in the configuration to determine a confidence level. One implementation of determining a confidence level is disclosed below:

FUNCTION HighConfidence(Results,NAMPS,ActualNo-AMPs)
   BEGIN
     1. If RPVPerc>=0 and <5% then
       a. Return false;
     2. Return true.
   END.

According to item 2, if more than 5% of the rows are sampled in calculating the RPV, then the confidence will be determined as high, otherwise the confidence will be determined as low. A response is then sent to the optimizer 250 with the RPV results and a confidence level. The optimizer 250 takes the response into account, among other factors, in determining whether to choose one execution plan or another for the query.

Figure 4:
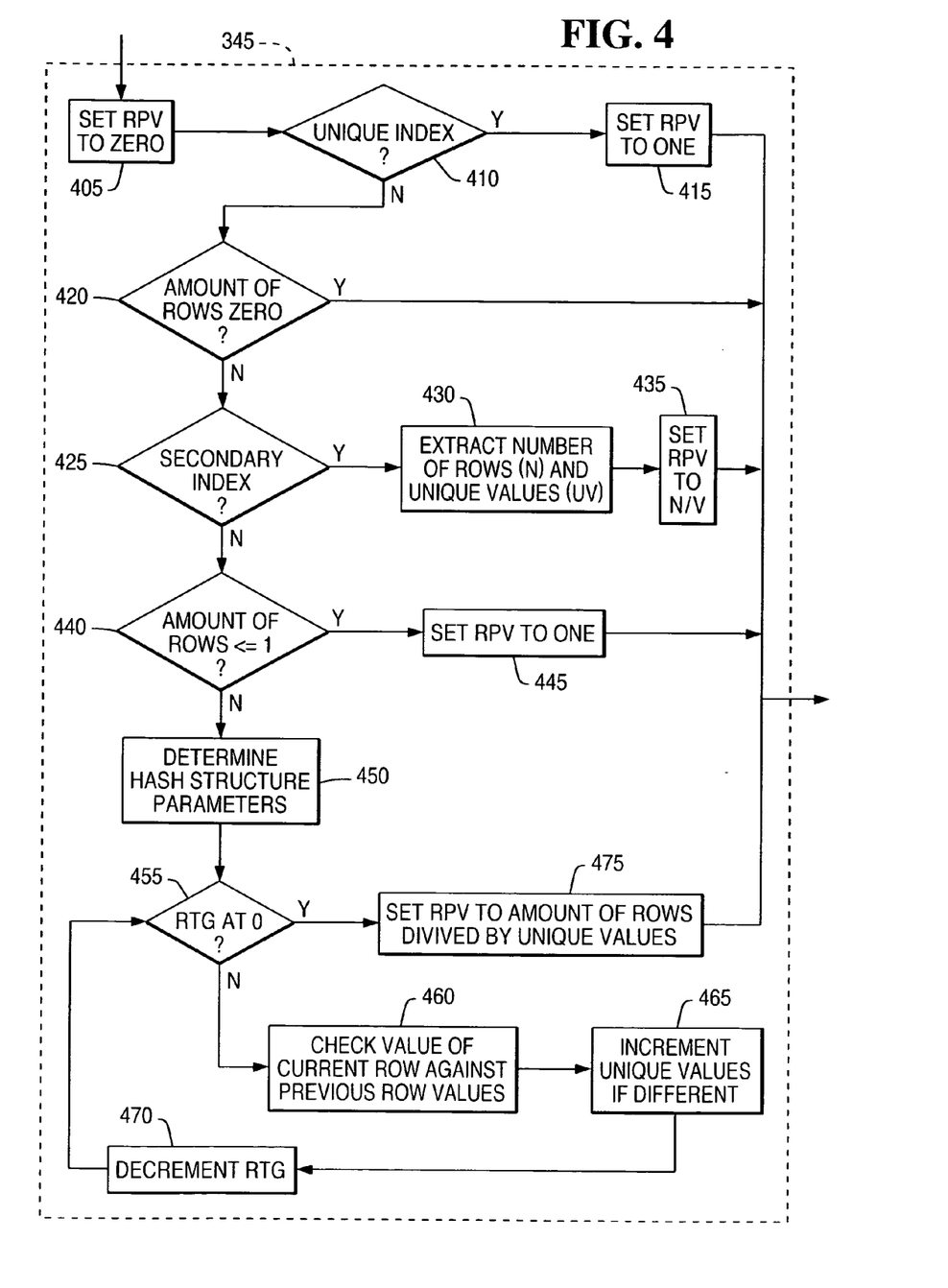
FIG. 4 is a flow chart of one method of calculating rows per unique value.

FIG. 4 is a flow chart of one method of calculating rows per unique value 345. One example data structure useful in implementing the method of FIG. 4 is illustrated in FIG. 6. In one implementation, the RPV is set to zero 405. If the column for which RPV is to be determined is a unique index 410, then by definition there is only one row per unique value contained in that column. As a result, the RPV is set to one and returned 415. If the number of rows in the table in the chosen storage is zero 420, then the RPV, which was set to zero 405, is returned. In some implementations, if the column for which RPV is to be determined is a secondary index 425, then the number of values in the column will be stored, for example in a storage area associated with the index sub-table of the column, and can be directly extracted along with the overall number of rows from the base table 430. The RPV is then calculated by dividing the numbers of rows by the number of unique values and returned 435. If the number of rows to be checked, which can be determined by applying a specified percentage to the available rows, is less than or equal to one 440, then RPV can be set equal to one and returned 445. The hash structure parameters are then determined, which can include modifying the percentage of rows to be checked 450. That process is discussed in more detail with respect to FIG. 5. A variable called rows to go (RTG) is set to the number of rows to be checked and a loop is formed with RTG at zero forming the loop exit 455. For each loop, the value of the current row for the one or more specified columns is compared to the corresponding values of previous rows 460. One particular method of performing that check is discussed with respect to the data structure shown in FIG. 6. In one implementation, if the current value(s) are different from previous values, then a unique values counter is incremented 465. In another implementation, the number of unique values is not counted until after the loop finishes. The value of RTG is then decremented 470 and the loop is restarted. Once RTG reaches zero 455, RPV is determined by dividing the number of rows by the number of unique values 475, which can be equal to a counter or can be counted separately from the loop. That RPV value is then returned. An example of one computer program for calculating RPV where the file storage of rows is divided into cylinders and blocks (and therefore both must be considered in constructing the loop) is disclosed below. The Sample-Block procedure uses the particular data structure shown in FIG. 6 and is discussed more and disclosed with respect that figure.

Figure 5:
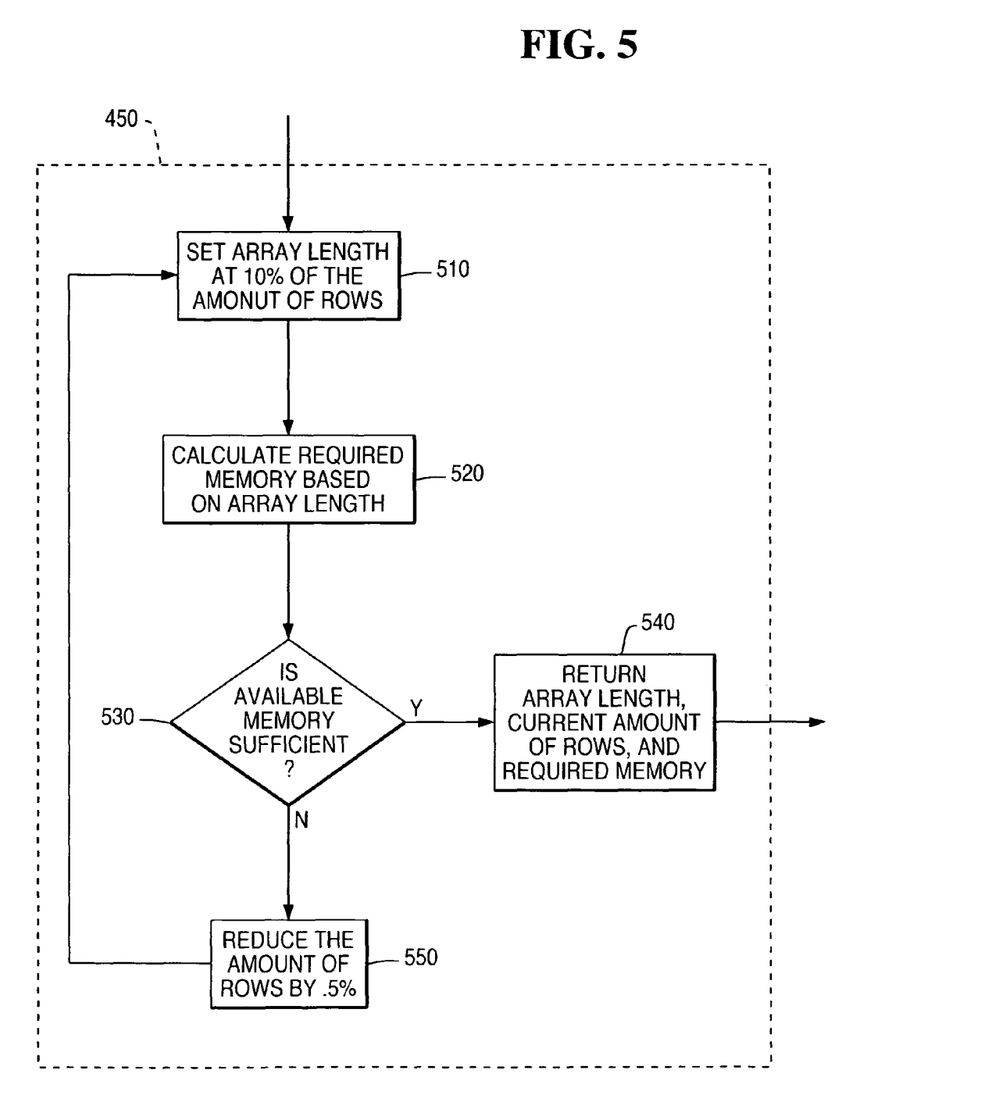
FIG. 5 is a flow chart of one method of determining hash structure parameters.
Figure 6:
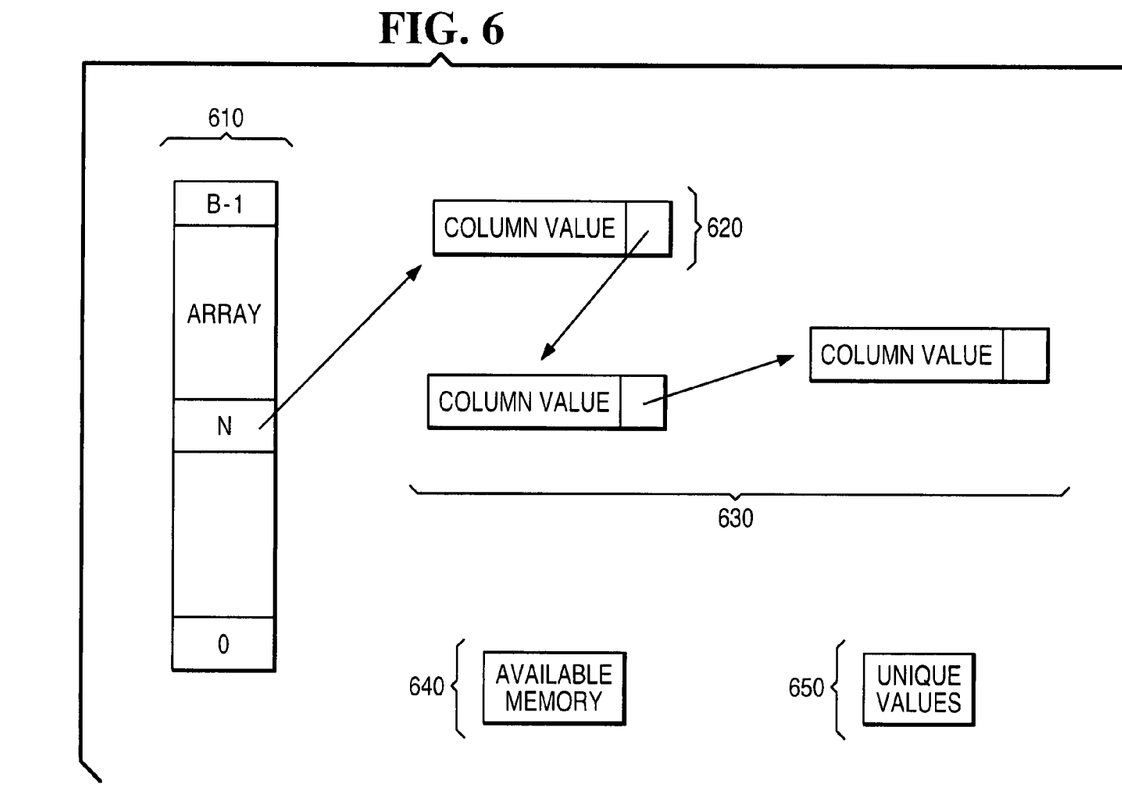
FIG. 6 is a diagram of a hash structure for recording unique values.

PROCEDURE RowsSampling (IN MEM, C, N; OUT RowsPerValue; IN OUT RowsSampling)
BEGIN
   1. RowsPerValue←zero;
   2. If the number of rows (N) in the base table is zero, then return;
   3. If C (the specified one or more columns for with RPV statistics are requested) is either unique primary index or unique secondary index Then
     a. RowsPerValue∴1;
     b. Return;
   4. If C is a NUSI (nonunique secondary index) Then
     a. Extract the number of unique values (uv) from the cylinder associated with the IST (Index Sub-Table) of C;
     b. If uv>0 Then
       i. RowsPerValue←N/uv;
       ii. Return;
   5. SpecialEstimate←True when hash structure can't be used for repeated rowhash values; otherwise False. For example, when C a non unique primary index (NUPI) and C is not part of a partitioned primary index SpecialEstimate is set to False;
   6. If RowsSampling equals zero then
     a. Return;
   7. PercentageSampled←RowsSampling/100.0;
   8. NRows←PercentageSampled×NumberOfRows;
   9. If NRows<=1 then
     a. RowsPerValue←1;
     b. Return;
   10. Call Length(MEM,C,N,B,S, PercentageSampled); Here MEM stands for the available memory, N stands for total number of rows in the processing module, B stands for the number of elements in the array Bucket and S stands for the size of the memory pool which is going to host the distinct unique values.
   11. NRows←(PercentageSampled/100.00)×N;
   12. RowsToGo←NRows; RowsSampledSoFar←0;
   13. HashStructurePtr←allocate space and initialize for B and S. If C is a NUSI there is no need to allocate space for the bucket and the memory pool;
   14. Cyl←first cylinder
   15. Block←first block 16. loop
   a. RowsToGo←SampleBlock(Cyl,Block,RowsToGo, HashStructurePtr, RowsSampledSoFar);
   b. If RowsToGo equal zero then
      i. RowsPerValue←RowsSampledSoFar/HashStructurePtr.UniqueValues;
      ii. Free HashStructurePtr;
      iii. Return;
   c. Block←FindNextBlock(Cyl);
   d. If Block is empty then
      i. Cyl←FindNextCylinder(Cyl);
      ii. Block←first block;
17. Release the memory allocated
END;

FIG. 5 is a flow chart of one method of determining hash structure parameters 450. The hash structure is discussed in more detail with reference to FIG. 6. The array length is initially set at 10% of the specified amount of rows 510. As one example, if SAMPLERPV is set at 20% for the session and 9000 rows are available on a particular processing module, then the number of rows sampled would be 1800 and the array length would be set at 180 for that processing module. The required memory for the entire hash structure is then calculated based on the array length 520. One implementation of such a calculation is included in the below computer program. If the required memory is less than the available memory 530, then the array length, the amount of rows, and the required memory are returned 540. If the required memory is greater than the available memory 530, then the number of rows is reduced by 0.5% 550 and the array length is reset 510. In one implementation, the reduction actually changes the specified percentage. In another, the number of rows determined from the percentage is modified. The loop continues until the number of rows results in a data structure that can be handled by the available memory. Regardless of the reduction, the eventual amount of rows is still based at least in part on the specified amount. An example of one computer program for determining the hash structure parameters is disclosed below.

PROCEDURE Length(IN MEM, C, N; OUT B, S, IN OUT Perc)
BEGIN
   1. LC←the size in bytes of the maximum length of C plus the storage needed for Next;
   2. NSampled←the number of rows N×Perc;
   3. Loop
   a. B←10% of NSampled;
   b. S←MEM−storage for the array Bucket, Next Available Block, Unique Value;
   c. If (S/(LC×B))<5 And SpecialEstimate then
      i. NSampled←NSampled−½% of NSampled;
      ii. Perc←NSampled/N;
   d. Else
      i. Return;
END.

FIG. 6 is a diagram of a hash structure for recording unique values. The hash structure is read to determine whether the one or more values of a row currently be considered are different from all previously read values. If the current one or more values are different, the hash structure is updated to reflect the new value for future reads and a unique values counter is incremented. The hash structure is index by an array 610 of B elements. In one implementation, B is set equal to 10% of the rows to be checked as discussed with reference to FIG. 5. A hash function is applied to the one or more values for each row to produce a hash result. The hash results are spread equally across the B values. In this way, rows with the same one or more values will always be mapped to the same array location. It is also possible sometimes, but not always rows with different one or more values may also be mapped to the same array location. By this approach, whether the one or more values currently being considered are different from previous values requires only checking values that map to the same array location, not all values in the entire hash structure. Each array location points to a linked list 630 of previously read values 620 that map to that location. In one implementation, each member 620 of the linked list 630 includes the one or more values being recorded and a pointer to the next member. The last member has a null value rather than a pointer. The specified one or more values for a current row are hashed to determined the corresponding location in the array. Those values are then compared to the one or more values in each member of the linked list to which the array location points. If a match is found, the current value is not different and the next row is accessed. If no match is found, the one or more values are added to the end of the linked list as a new member and the unique values counter 650 is incremented by one. In one implementation, a pointer 640 to the next available memory location is maintained so that the new member can be located at an unused portion of memory. In this implementation, the available memory pointed is also decremented by the size of the linked list member when a different one or more value is determined and added to the structure. An example of one computer program for determining whether the read values are different from all previously read values and recording the one or more values in the hash structure is disclosed below.

PROCEDURE SampleBlock(IN Cyl,Block,C; IN OUT RowsToGo,HashStructurePtr,RowsSampledSoFar)
BEGIN
   1. When called for the first time set PreviousRHash to NULL;
   2. Read in the block;
   3. If SpecialEstimate is True Then
      a. For each row in the block and till end of Block not reached do
         i. Increment RowsSampledSoFar by one. If C represents a NULL value then
            1. Ignore this row;
         ii. Do a lookup operation using the values of C extracted from the row.
         iii. If the lookup fails then
            1. The actual values of C are installed in the hash data structure;
            2. If the hash data structure overflows then
               a. adjust the value of PercentageSampled;
               b. set RowsToGo to 0;
               c. The Unique Values is increased by one.
               d. Return
            3. The UniqueValues is increased by one.
         iv. Decrement RowsToGo by 1;
      b. Return;
   4. For each row in the block and till end of Block not reached do
      a. Increment RowsSampledSoFar by one. If C represents the NULL value then
         i. Ignore this row;
      b. Copy the rowhash in the row into RHash;
      c. If PreviousRHash is different from RHash Then
         i. Add 1 to UniqueValues;
         ii. Copy RHash to PreviousRHash;
         iii. Reset the hash structure lookup table along with the array bucket;

-continued

```
            iv. Make next available block point to the first
                address of the memory
pool;
        d. Else
            i. Do a lookup operation using the values of C
               extracted from the row.
            ii. If the lookup fails then
                1. The actual values of C are installed
                   in the hash data structure;
                2. If the hash data structure overflows
                   then
                        a. Adjust the value of
                           PercentageSampled;
                        b. Set RowsToGo to 0;
                        c. Add 1 to Unique Values.
                        d. Return
                3. Add 1 to UniqueValues.
                        e. Decrement
                           RowsToGo by 1;
END.
```

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for optimizing a query of a table based on one or more values in one or more columns of the table, the table having available rows, comprising the steps of:
   repeating the following steps for a series of rows in the table and optimizing an execution plan for the query based at least in part on a calculated number of rows per unique value;
   reading the one or more values for the one or more columns;
   determining whether the read values are different from all previously read values; and
   if the read values are different, recording the one or more values in a first data structure pointed to by an entry in a second data structure, including determining a location of the entry in the second data structure by applying a hash function to the one or more values.

2. The method of claim 1 further comprising the step of:
   specifying a percentage of rows;
   and where the series of rows is based at least in part on applying the percentage to the available rows.

3. The method of claim 2 where the series of rows is based on applying the percentage to the available rows after reducing the percentage based on available memory.

4. The method of claim 1 where recording the one or more values further includes incrementing a unique values counter.

5. The method of claim 1 where optimizing an execution plan includes counting the values in the first data structure after repeating the steps for the series of rows.

6. The method of claim 1 where the first data structure is a linked list.

7. The method of claim 1 where the second data structure comprises an array of hash function results.

8. A computer program, stored on a tangible non-transitory storage medium, for executing database queries, the program comprising executable instructions that cause a computer to:
   repeat the following steps for a series of rows in a table, the table having available rows, and optimize an execution plan for a query of the table based on one or more values in one or more columns of the table based at least in part on a calculated number of rows per unique value;
   read the one or more values for the one or more columns;
   determine whether the read values are different from all previously read values; and
   if the read values are different, record the one or more values in a first data structure pointed to by an entry in a second data structure, a location of the entry in the second data structure determined by applying a hash function to the one or more values.

9. The computer program of claim 8 further comprising executable instructions that cause a computer to:
   store a percentage of rows
   and where the series of rows is based at least in part on applying the percentage to the available rows.

10. The computer program of claim 9 where the series of rows is based on applying the percentage to the available rows after reducing the percentage based on available memory.

11. The computer program of claim 8 where the one or more values are recorded by incrementing a unique values counter.

12. The computer program of claim 8 where the execution plan is optimized by counting the values in the first data structure after repeating the steps for the series of rows.

13. The computer program of claim 8 where the first data structure is a linked list.

14. The computer program of claim 8 where the second data structure comprises an array of hash function results.

15. A database system for executing database queries, comprising:
   one or more nodes;
   a plurality of CPUs, each of the one or more nodes providing access to one or more CPUs;
   a plurality of virtual processors, each of the one or more CPUs providing access to one or more virtual processors;
   each virtual processor configured to manage data, including rows organized in tables, stored in one of a plurality of data-storage facilities; and
   an optimizer configured to:
      repeat the following steps for a series of rows in a table, the table having available rows, and optimize an execution plan for a query of the table based at least in part on a calculated number of rows per unique value of one or more columns of the table;
      read the one or more values for the one or more columns;
      determine whether the read values are different from all previously read values; and
      if the read values are different, record the one or more values in a first data structure pointed to by an entry in a second data structure, a location of the entry in the second data structure determined by applying a hash function to the one or more values.

16. The database system of claim 15 where the optimizer is further configured to:
   store a percentage of rows;
   and where the series of rows is based at least in part on applying the percentage to the available rows.

17. The database system of claim 16 where the series of rows is based on applying the percentage to the available rows after reducing the percentage based on available memory.

18. The database system of claim 15 where the one or more values are recorded by incrementing a unique values counter.

19. The database system of claim 15 where the execution plan is optimized by counting the values in the first data structure after repeating the steps for the series of rows.

20. The database system of claim 15 where the first data structure is a linked list.

21. The database system of claim 15 where the second data structure comprises an array of hash function results.

* * * * *